United States Patent [19]

Head

[11] Patent Number: 4,574,244

[45] Date of Patent: Mar. 4, 1986

[54] QAM DEMODULATOR AUTOMATIC QUADRATURE LOOP USING N-M LSB'S

[75] Inventor: Manley J. Head, Wylie, Tex.

[73] Assignee: Rockwell International Corporation, El Segundo, Calif.

[21] Appl. No.: 623,802

[22] Filed: Jun. 22, 1984

[51] Int. Cl.[4] .................. H03D 3/18; H03K 9/02; H04L 5/12; H04L 25/02

[52] U.S. Cl. .................................... 329/50; 329/109; 329/124; 375/39; 375/120; 455/214

[58] Field of Search ............... 329/50, 109, 122, 124; 375/120, 39; 455/214

[56] References Cited

U.S. PATENT DOCUMENTS

| | | | |
|---|---|---|---|
| 3,638,125 | 1/1972 | Goell | 329/124 X |
| 3,789,316 | 1/1974 | Goetz et al. | 329/124 |
| 4,054,838 | 10/1977 | Tretter | 375/120 |
| 4,105,975 | 8/1978 | Sanders et al. | 375/120 X |
| 4,188,589 | 2/1980 | Brown et al. | 329/122 X |
| 4,458,356 | 7/1984 | Toy | 375/120 |
| 4,464,770 | 8/1984 | Maurer et al. | 375/119 |

FOREIGN PATENT DOCUMENTS 2735945  4/1978  Fed. Rep. of Germany ........ 329/50

Primary Examiner—Eugene R. LaRoche
Assistant Examiner—D. C. Mis
Attorney, Agent, or Firm—V. Lawrence Sewell; H. Fredrick Hamann

[57] ABSTRACT

A quadrature amplitude modulation (QAM) demodulator system has in-phase and quadrature channel detectors receiving local oscillator signals which must be in precise phase quadrature relationship with each other. The in-phase and quadrature channels each have analog-to-digital converters with n output bits, where n is greater than m, the number of bits required for the data output for each channel. The n-m less significant bits in one channel are used to derive a signal indicating the deviation from a true quadrature relationship between the local oscillator signals. The error signal controls an adjustment of the phase of one of the local oscillator signals, to bring about the precise quadrature relationship required for accurate demodulation.

11 Claims, 3 Drawing Figures

QAM DEMODULATOR AUTOMATIC QUADRATURE LOOP USING N-M LSB'S

BACKGROUND OF THE INVENTION

This invention relates to automatic phase adjustment of a local oscillator signal in one channel of a QAM demodulator to assure a phase quadrature relationship between local oscillator signals in the two channels of the demodulator.

A QAM demodulator has in-phase and quadrature channels, each with its own phase detector receiving the QAM signal to be demodulated. The phase detectors also require local oscillator inputs having a phase quadrature relationship with respect to each other, that is separated in phase by ninety degrees. This quadrature relationship is very important. In a practical system it has been found necessary that the phase relationship of the local oscillator inputs to the detectors be within several hundredths of a degree of ninety degrees.

The basic quadrature phase shift required can be achieved by applying the output of the local oscillator through the phase port of a 0°/90° hybrid to the phase detectors. However, several factors operate to cause deviation from the precise quadrature relationship required. For one thing, one of the alignment procedures for the demodulator acts directly to minimize intermodulation distortion, but affects the phasing of a local oscillator signal. In the long term, component aging and temperature impact the quadrature relationship of carrier and local oscillator signals in both the modulator and demodulator portions of a QAM system.

SUMMARY OF THE INVENTION

In accordance with the present invention, there is provided a QAM demodulator having in-phase (I) and quadrature (Q) channels, each with an m bit demodulated output, thus defining a $2^m \times 2^m$ QAM vector space. Each of the channels of the demodulator has a phase detector with one input receiving the QAM signal to be demodulated and the other input receiving a local oscillator signal at the carrier frequency. Circuitry separate from the invention establishes a nominal quadrature relationship between the local oscillator signals applied to the two channels.

The output of each phase detector is processed by an analog-to-digital converter with an output of more than the m bits, with the demodulated output being taken from the most significant m bits of the converter. The less significant bits can be used, in accordance with the invention, to ensure that an exact quadrature relationship is maintained between the local oscillator signals applied to the two channels.

From the less significant bits, there is derived a signal indicating the error in phase alignment between the local oscillator signal applied to one of the channels and the vector space of the QAM signal in this channel. The error signal is used to control the phase of the local oscillator signal for the channel. This closed loop operation drives the phase of the local oscillator signal for the channel to the precise quadrature relationship necessary to properly demodulate the QAM signal.

In the presence of demodulator component changes, due to aging, temperature or other effects, the phase controlled demodulator of the invention maintains the necessary quadrature relationship between local oscillator signals in the I and Q channels. If such effects change the quadrature relationship of corresponding carrier waveforms in an associated transmitter modulator, the present invention does not produce an exact ninety degree relationship between the local oscillator signals and the channels of the demodulator. Instead, it recreates in the demodulator the phase relationship between the comparable waveforms of the transmitter modulator.

DESCRIPTION OF PREFERRED EMBODIMENT

The description hereinafter is generally applicable to QAM systems, including 64 QAM, but for clarity will be described in terms of 16 QAM. A preferred embodiment of the system according to the invention employed a 70 MHz suppressed carrier transmission.

Figure 1:
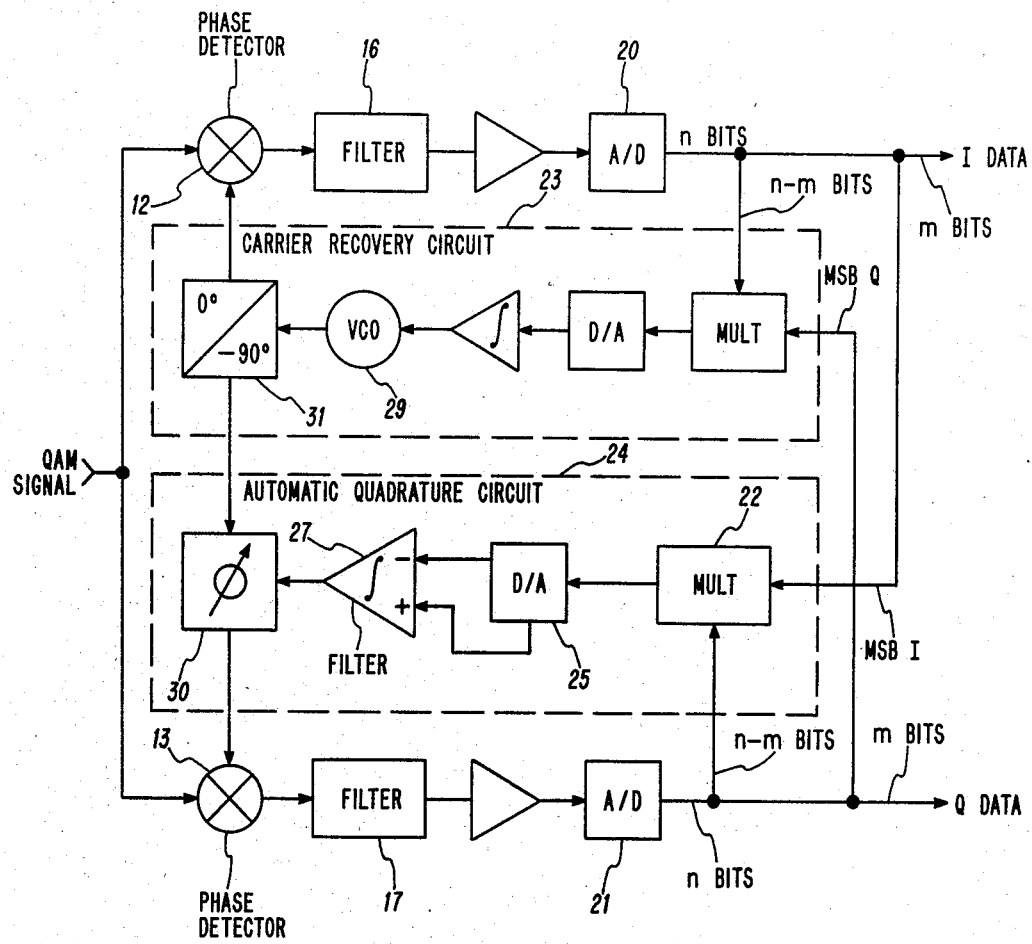
FIG. 1 is a block diagram of a demodulator in accordance with the invention.

FIG. 1 shows a block diagram of a demodulation system in accordance with the invention. A received QAM signal is applied to one input of phase detector 12 of the in-phase (I) channel and to one input of phase detector 13 of the quadrature (Q) channel. The outputs of detectors 12 and 13 are filtered by filters 16 and 17, providing spectral shaping complimentary to related filtering in the transmission process. After amplification, analog-to-digital converters 20 and 21 provide an n bit digital representation of the detected and filtered waveforms in their respective channels. In a preferred embodiment, the output of the analog-to-digital converters is five bits. The number of bits, m, necessary to represent the demodulated output of one channel of a 16 QAM system is two. In this preferred embodiment, the remaining three bits of the analog-to-digital output are used to provide automatic quadrature control.

The operation of carrier recovery circuit 23 is separate from the present invention and is described in my copending U.S. patent application Ser. No. 623,801 entitled "QAM Demodulator Carrier Recovery Loop Using N-M LSB's", filed June 22, 1984. In brief, circuit 23 forms with the I channel a phase locked loop in which voltage controlled oscillator 29 provides through hybrid 31 a local oscillator signal to phase detector 12. This local oscillator signal has the frequency of the QAM suppressed carrier and is in phase lock with the QAM signal in the I channel for proper demodulation of that signal. The output of VCO 29 is supplied by hybrid 31 to the I channel with no phase shift and to the Q channel with ninety degrees phase shift.

A phase adjustment circuit 30 controls the local oscillator signal from hybrid 31 to provide the precise quadrature relationship required between the I and Q channels. The phase adjustment circuit 30 is controlled by an error signal the size of which is derived from the Q channel. This is because, as illustrated, the local oscillator signal for the I channel is locked in proper phase relationship for that channel by carrier recovery circuit 23, and automatic quadrature circuit 24 operates to produce the precise phase relationship required for the local oscillator signal in the Q channel. It is also possible to design the system so that carrier recovery circuit 23 operates with respect to the Q channel, and automatic quadrature circuit 24 operates with respect to the I channel. It should also become apparent herein that the automatic quadrature circuit 24 can operate in cooperation with other carrier recovery circuits than the one described in my referenced copending application and illustrated in FIG. 1.

In the automatic quadrature circuit 24, the n-m or three bits are processed, including by a digital-to-analog converter 25 and filter 27 to drive phase adjustment circuit 30. Circuit 30 adjusts the phase of the local oscillator signal applied to the Q channel so that this oscillator signal is in phase alignment with the demodulated QAM output of the Q channel. For an understanding of this process, consideration is given to FIG. 2.

Figure 2:
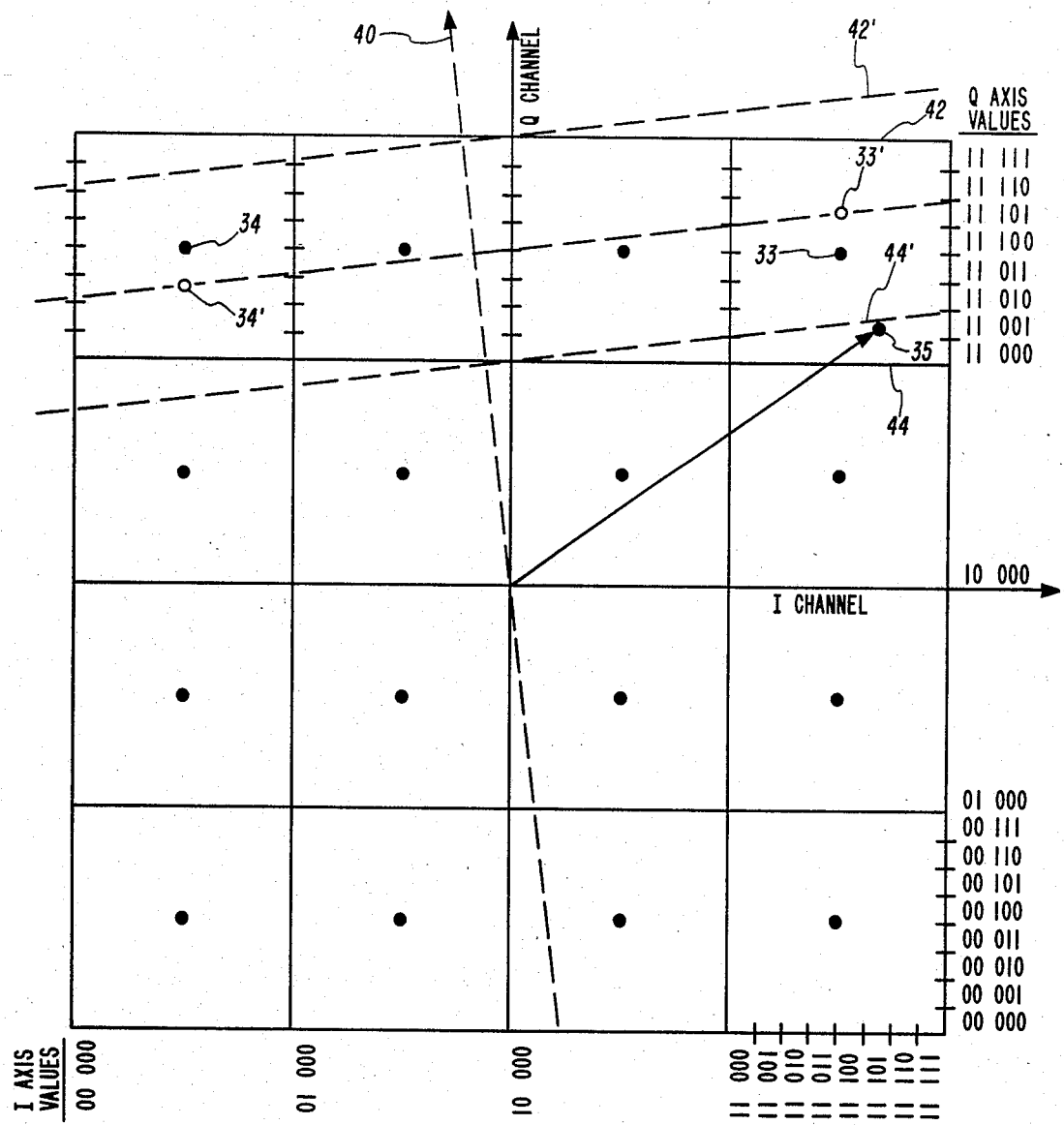
FIG. 2 is a diagram of a 16 QAM vector space as related to the system of FIG. 1.

FIG. 2 is a diagram of the signal vector space for a 16 QAM signal. Electrical signals are conventionally represented as a two dimensional vector having a magnitude given by the amplitude of the signal and a phase equal to the phase of the signal. If the phase is taken with respect to a reference waveform of the same or similar frequency, then the signal vector may remain at a substantially fixed phase angle indicating the difference in phase between the signal and the reference waveform or may move in relatively slow rotation about the origin.

If FIG. 2 is viewed as representing the vector space of the received QAM signal referenced to its suppressed carrier, then the QAM signal at any instant can, in the absence of distortion or noise, be represented by one of sixteen vectors extending from the origin to one of the dots such as dot 33. It is the task of the demodulator and a decoder, which follows the demodulator and is not shown here, to identify which of these vector values is being received at any given instant.

As a practical matter, the demodulator identifies any vector value lying in the square surrounding dot 33 with the ideal state represented by dot 33. The way this works in the demodulator of FIG. 1 can be seen by considering a sample signal vector value represented by point 35. The five output bits of I channel A/D converter 20 are shown along the bottom of FIG. 2 as the I axis values or coordinates. Thus, the I axis coordinate of signal point 35 is 11101. The Q channel A/D converter 21 output is the Q axis coordinate along the right hand side of the figure, in this case 11001. For the I and Q channel data outputs, only the two most significant bits of the analog-to-digital converters are used, so that the I channel output is 11 and the Q channel output is 11. These values would be output by the demodulator for any signal vector in the square containing dots 35 and 33.

The last three significant bits of A/D converter 21 measure the distance of a point along the Q axis from the bottom of a square to the top. As can be seen in the two squares for which all five bits are shown in FIG. 2, the least significant bits progress in increments of 1 from 000 on the bottom to 111 at the top of each square. The three less significant bits of A/D converter 20 provide the same measure on the I axis.

The dashed line 40 in FIG. 2 shows a large deviation of the Q channel axis from a ninety degree relationship with the I channel axis. This would occur if the local oscillator input to phase detector 13 is not in phase alignment with the suppressed QAM carrier corresponding to the Q channel. Dashed lines 42' and 44' are a shifting of lines 42 and 44, respectively, to illustrate that the boundaries for identifying bits in the Q channel are shifted by the shift in the Q axis. The demodulated output for point 35 would now be 10, rather than 11.

The information used to automatically maintain quadrature in accordance with the invention is illustrated by points 33 and 33'. In the presence of the Q axis phase shift, a vector at point 33' will have the same five bit Q access value as did point 33 without the shift. A vector at point 33 will have a different value in the presence of the shift, and this difference can be used as an error signal to detect the coordinate shift. In the demodulator of FIG. 1, the three less significant bits from A/D converter 21 are used to measure the distance in the Q dimension of a demodulated vector point from the center of its square in the vector space.

Referring to FIG. 1, it is seen that the n-m or three bits from A/D converter 21 are input to a multiplier 22. The other input of the multiplier is the most significant bit of the m bits in the I channel. The reasons for this multiplication can be understood from FIG. 2 by consideration of points 33' and 33, as well as points 34' and 34. Points 33' and 33 are in the half of the vector space, wherein the most significant I axis bit is 1, and the difference in the three bit Q axis values for points 33' and 33 is positive. For points 34' and 34, where the most significant bit in the I axis coordinate is 0, the difference in three bit Q axis value is negative. Thus, multiplier 22 provides an output in which the sign of the three bits is controlled dependent on the I axis value.

The sign controlled three bits from multiplier 22 are input to digital-to-analog converter 25. Converter 25 provides its analog output to filter 27 which averages or smooths variations in the value of the three bit group. In a practical embodiment, filter 27 was chosen so that the control loop including automatic quadrature circuit 24 was a Type I second order loop with a bandwidth of approximately 1 kHz and a damping factor much greater than 1.

D/A converter 25 provides to the positive input of operational amplifier-based filter 27 a reference value which is the midpoint of its output analog range, that is, midway between the analog voltages corresponding to 111 and 000 inputs. This causes the input to filter 27 to be referenced with respect to the centers of the squares in FIG. 2. Thus, if a vector occurs at point 33, filter 27 should receive an input of zero, if the Q axis is in quadrature phase relationship to the I axis. In the presence of a Q axis shift, a non-zero error signal will occur at the input to filter 27. If a number of different vectors are demodulated in the presence of a Q axis shift, filter 27 should output a non-zero error signal caused by the shift. This signal is input to phase adjustment circuit 30. The control loop including automatic quadrature circuit 24, phase detector 13 and A/D converter 21 is connected in negative feedback relationship, so that phase adjustment circuit 30 is driven to correct the phase of the local oscillator signal applied to phase detector 13 so as to eliminate a shift in the Q axis in FIG. 2.

Figure 3:
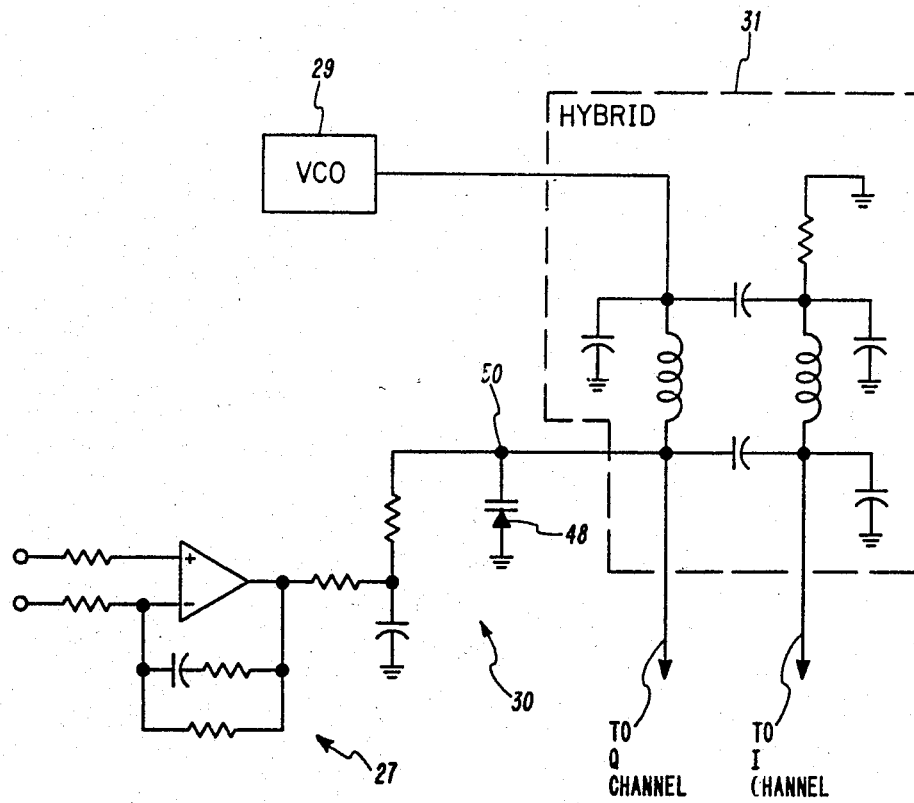
FIG. 3 is a schematic diagram of phase adjustment circuitry employed in the system of FIG. 1.

FIG. 3 illustrates a circuit by which the phase adjustment can be accomplished. As seen there, the output of voltage controlled oscillator 29 is applied to hybrid 31, providing outputs for the Q channel and I channel. A signal from filter 27 acting on varactor diode 48 of adjustment circuit 30 causes the required adjustment in the signal provided by hybrid 31 to the Q channel.

Thus, in accordance with the invention, n-m bits from the Q channel A/D converter are used to generate an error signal for producing the required precise quadrature phase alignment of the Q channel local oscillator signal with respect to the Q channel vector space. It will be apparent to those skilled in the art that various numbers of n-m bits can be used to derive such an error signal. A greater number of bits is required for greater precision.

I claim:

1. A system for the demodulation of a Quadrature Amplitude Modulation (QAM) signal, of the type having in-phase and quadrature channels, each having an m bit demodulated output, thereby defining a $2^m \times 2^m$ QAM vector space, said system comprising:
   detector means in each of said channels, each detector means responsive to said QAM signal and a signal at a carrier frequency input, and each for generating an analog output;
   an analog-to-digital converter, responsive to said analog signal in a first one of said channels, for providing said m bits and a bit group including at least the most significant one of the bits less significant than said m bits in the digital representation of the analog signal;
   a control loop including said detector means in said first channel and said analog-to-digital converter, and further including
   means for adjusting, in response to a control signal, the phase of a local oscillator signal which is nominally phase aligned with said QAM vector space, and for applying the phase adjusted signal to the carrier frequency input of said first channel detector means, and
   means for deriving from said bit group a measure of the phase difference between the phase adjusted oscillator output applied to said first channel and said demodulated output vector space, and for providing a control signal representative of said measure to the means for phase adjusting,
   whereby the means for phase adjusting is controlled to provide the local oscillator output to the detector in said first channel in controlled phase alignment with respect to said QAM vector space, for properly demodulating said QAM signal.

2. The system of claim 1, wherein said means for deriving a measure includes means, responsive to said bit group, for providing said bit group with the sign thereof controlled.

3. The system of claim 2, wherein said means for controlling the sign includes means for controlling said sign in response to the most significant bit of said m bits in the second one of said channels.

4. The system of claim 3, wherein said means for controlling the sign includes means for multiplying said bit group by said most significant bit of said m bits.

5. The system of claim 1, wherein said bit group includes at least the most significant three of said bits less significant than said m bits.

6. The system of claim 2, wherein said means for providing a control signal includes means for referencing said control signal with respect to a midpoint value of said bit group.

7. The system of claim 2, wherein said means for providing a control signal includes means for smoothing variations in the value of said bit group.

8. The system of claim 2, wherein said means for deriving a measure includes a digital-to-analog converter responsive to said bit group with the sign thereof controlled.

9. The system of claim 8, wherein said means for providing a control signal includes means for deriving said control signal from the deviation of the digital-to-analog converter output about its midpoint value.

10. The system of claim 8, wherein said means for providing a control signal includes means for filtering the output of the digital-to-analog converter.

11. A system for the demodulation of a Quadrature Amplitude Modulation (QAM) signal, of the type having in-phase and quadrature channels, each having an m bit demodulated output, thereby defining a $2^m \times 2^m$ QAM vector space, said system comprising:
    detector means in each of said channels, each detector means responsive to said QAM signal and a signal at a carrier frequency input, and each for generating an analog output;
    an analog-to-digital converter, responsive to said analog signal in a first one of said channels, for providing said m bits and a bit group including at least the most significant one of the bits less significant than said m bits in the digital representation of the analog signal;
    a control loop including said detector means in said first channel and said analog-to-digital converter, and further including
    means for adjusting, in response to a control signal, the phase of a local oscillator signal which is approximately phase aligned with said QAM vector space, and for applying the phase adjusted signal to the carrier frequency input of said first channel detector means, and
    means for deriving from said bit group a measure of the phase difference between the phase adjusted oscillator output applied to said first channel and said demodulated output vector space, and for providing a control signal representative of said measure to the means for phase adjusting, including
    means, responsive to the value of said bit group, for providing said bit group value with the sign thereof controlled by the most significant bit of said m bits in the second one of said channels,
    a digital-to-analog converter responsive to the bit group value with the sign thereof controlled,
    means for filtering the output of the digital-to-analog converter to provide said control signal, and
    means for referencing the control signal for said oscillator with respect to a midpoint value of said bit group with the sign thereof controlled,
    whereby the means for phase adjusting is controlled to provide the local oscillator output to the detector in said first channel in controlled phase alignment with respect to said QAM vector space, for properly demodulating said QAM signal.

* * * * *